United States Patent [19]

Stover

[11] Patent Number: 4,981,400

[45] Date of Patent: Jan. 1, 1991

[54] SELF-CENTERING JIG

[76] Inventor: H. Lee Stover, Rte. 1, Box 320-A, Dayton, Va. 22821

[21] Appl. No.: 454,385

[22] Filed: Dec. 21, 1989

[51] Int. Cl.$^5$ .............................................. B23B 47/28
[52] U.S. Cl. .................................. 408/115 R; 33/667; 33/675; 33/679; 408/108
[58] Field of Search .................. 33/667, 670, 673, 675, 33/679; 408/72 R, 97, 108, 115 R, 72 B

[56] References Cited

U.S. PATENT DOCUMENTS

| | | |
|---|---|---|
| 826,425 | 8/1906 | Heathcote . |
| 1,545,424 | 7/1925 | Heimrich . |
| 2,197,505 | 4/1940 | Moser . |
| 2,203,992 | 6/1940 | Lutz . |
| 2,211,634 | 8/1940 | Baker .............................. 408/115 R |
| 2,479,912 | 8/1949 | Desy ...................................... 33/673 |
| 2,582,606 | 1/1952 | Riddle . |
| 2,599,819 | 6/1952 | Fisher ..................................... 33/675 |
| 2,807,095 | 9/1957 | Maxwell . |
| 2,842,860 | 7/1958 | Gray . |
| 3,026,748 | 3/1962 | Comorau ........................ 408/115 R |
| 3,197,874 | 8/1965 | Fox . |
| 3,273,426 | 9/1966 | Cleveland . |
| 3,345,755 | 10/1967 | Ferebee ................................ 33/675 |
| 3,583,823 | 6/1971 | Eaton et al. .................... 408/115 R |
| 3,973,860 | 8/1976 | Kern ................................ 408/115 R |
| 4,257,166 | 3/1981 | Barker et al. .................... 408/115 B |
| 4,270,276 | 6/1981 | Skura . |
| 4,791,732 | 12/1988 | Bruno, Jr. et al. . |

FOREIGN PATENT DOCUMENTS

| | | | |
|---|---|---|---|
| 3039673 | 5/1982 | Fed. Rep. of Germany ... 408/115 R |
| 1352703 | 5/1974 | United Kingdom ............ 408/115 R |

Primary Examiner—Daniel W. Howell
Attorney, Agent, or Firm—James C. Lydon

[57] ABSTRACT

A self-centering jig for planar articles having a vertical and horizontal centerline, capable of centering in both the horizontal and vertical directions, is disclosed. The self-centering jig comprises a jig body a having a template section, a first pair of operatively connected arms extendibly mounted in the jig for uniform horizontal movement in opposite directions from a vertical centerline, and a second pair of operatively connected arms extendibly mounted in the jig body for uniform vertical movement in opposite directions from a horizontal centerline. The template section may be removable, and can be interchanged with other templates to permit drilling of different patterns using the same jig. The template section may also contain a plurality of holes for a plurality of patterns, such that a single template may be used to drill several patterns.

17 Claims, 4 Drawing Sheets

SELF-CENTERING JIG

BACKGROUND OF THE INVENTION

The present invention relates to a self-centering jig for planar articles, such as, for example, cabinet drawer fronts. The self-centering jig may be used to accurately and precisely mark and/or drill such planar articles. The construction and operation of the present invention will be described in relation to the cabinetry making art, although those of ordinary skill in the art will recognize the invention has utility in other fields where highly accurate and repetitive marking and/or drilling is required.

One of the required tasks in the cabinetry making art is to accurately drill holes in a drawer front to permit the installation of drawer pulls or knobs. The location and number of holes will depend on the size of the drawer front and the number of pulls or handles to be fitted to the drawer front.

Manual location and drilling of such holes is dependent on the skill and care of the individual worker. Thus, the art has sought to ensure a minimum standard of accuracy is achieved by the use of various tools such as templates. See, for example, U.S. Pat. No. 2,203,992 to Lutz, which describes a template-type marking instrument for drawer pulls. Similar gauges and templates are described in U.S. Pat. Nos. 1,545,424; 2,197,505; 2,582,606; 2,807,095; 3,197,874; 4,257,166; 4,270,276 and 4,791,732. Although such templates do improve the consistency of individual workers, these tools all depend on manual initial adjustment.

The problem of manual initial adjustment is partially addressed in U.S. Pat. No. 2,842,860 to Gray, which discloses an automatically horizontally centering drawer handle marking device. The device includes a horizontal support bracket adapted to receive the top edge portion of the drawer. Horizontally extending positioning arms engage opposite side edges of the drawer front. Movement of one arm causes automatic movement of the other arm such that the device will automatically be centered between the two sides. Selected openings are provided from which a punch can be inserted to mark the locations at which screws are to extend into the drawer.

A similar device is disclosed in U.S. Pat. No. 3,583,823 to Eaton et al, which discloses an adjustable fixture for locating hole locations for various size draw pulls on various width drawers. The fixture has an elongated body with interconnected extendable arms having abutment means on the ends thereof for engaging the sides of a drawer to align the centerline of the fixture at the midpoint between the drawer sides. Guide apertures are formed in interconnected blocks that move uniformly in opposite directions to adjust the spacing between the guide apertures to accommodate various size drawer pulls. The adjustable fixture has an adjustable support means and distance scale for vertically positioning the fixture on a drawer face.

Both Gray and Eaton et al depend on manual vertical positioning of the apparatus, which provides a possible source of error and also reduces productivity by requiring additional operator time.

An object of the present invention is to provide a self-centering jig which automatically locates a point in both the horizontal and the vertical directions, thereby eliminating the influence of the individual artisan in the location of holes or marks on a workpiece.

Another object of the present invention is to provide a self-centering which improves productivity by reducing the time required for accurately marking and/or drilling operations.

SUMMARY OF THE INVENTION

In one aspect, the present invention is a self-centering jig for precisely locating at least one point on a planar article, comprising (i) a jig body having a vertical centerline and a horizontal centerline and having a template section;

(ii) a first pair of operatively-connected arms extendibly mounted in the jig body for uniform horizontal movement in opposite directions from said vertical centerline, said arms having means for engaging the vertical sides of the planar article on the ends of said arms;

(iii) means for mounting and operatively connecting said first pair of arms to said jig body, such that when said engaging members are engaged with said vertical sides of said planar article said jig body is centered on a vertical centerline of said planar article;

(iv) a second pair of operatively-connected arms extendibly mounted in the jig body for uniform vertical movement in opposite directions from said horizontal centerline, said arms having means for engaging the top and bottom edges of said planar article;

(v) means for mounting and operatively connecting said second pair of arms to said jig body, such that when said engaging means are engaged with said top and bottom edges of said planar article said jig body is centered on a horizontal centerline of said planar article.

DETAILED DESCRIPTION OF THE PREFERRED EMBODIMENTS

The jig body has both a vertical and a horizontal centerline, and has a template section having at least one drill hole. In a preferred embodiment, the template section is located at the center of the jig body, and is a physically distinct portion which ay be removed from the jig body. In another preferred embodiment, the rear surface of the jig body is planar and smooth to permit accurate positioning of the jig body against the planar article which is to be marked or drilled without marring the surface of the planar article.

Figure 4:
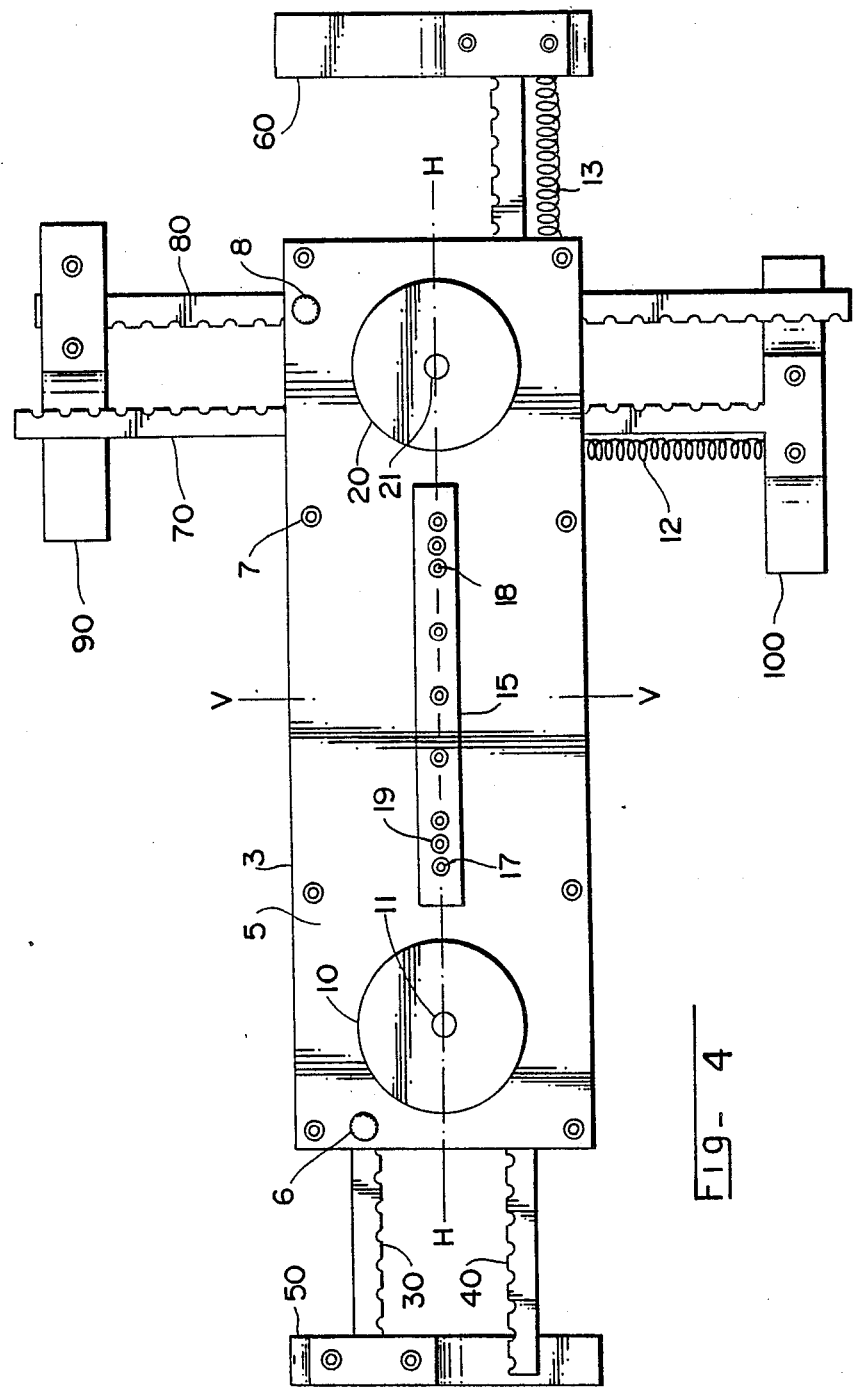
FIG. 4 is a plan view of the self-centering jig illustrated in FIG. 1 which also depicts optional arm position maintaining means and drill hole inserts.

The template section may be provided with a plurality of template hole patterns which may be standard industry patterns and/or metric based. Each drill hole is of the same size. The template section is made of a hardened material to withstand wear even after repeated use with a drill bit. Preferably, the material is sufficiently hard to withstand 10,000 drillings without significant wear. Oil-quenched-hardened steel is especially preferred. In one preferred embodiment, the internal diameter of the drill holes are slightly larger than a commonly used drill size, and magnetized drill hole plugs are provided for each drill hole. Removing only those plugs which correspond to a desired drill pattern precludes the possibility that a hole which is not part of the desired pattern is inadvertently drilled. Alternatively, each of the drill holes is provided with internal threading therethrough for receiving a cylindrical threaded insert therein. The insert may be provided with a longitudinal bore therethrough for receiving a drill bit. The outside diameter of the insert is of a standard size commensurate with the threaded hole through the template, while the drill bit hole extending longitudinally therethrough may be of different sizes to receive different sized drill bits. Inserts 19 are illustrated in FIG. 4.

The jig body, other than the template section, may be constructed of rigid but lightweight material to facilitate easy positioning and use of the jig. Suitable materials include aluminum and various polymeric materials. Grease-impregnated nylon is preferred.

The interior of the jig body contains means for mounting and operatively connecting a first pair of arms which are adapted for uniform opposite movement in relation to the vertical centerline of the jig body. Preferably, the arms are operatively connected by a gear which is rotably mounted in the jig body interior. The gear also serves to mount the two arms in the jig body interior, preferably in combination with at least one guide for each arm to slidably position the two arms in parallel relationship to the horizontal centerline of the jig body.

The interior of the jig body also contains means for mounting and operatively connecting a second pair of arms, which are adapted for uniform opposite movement in relation to the horizontal centerline of the jig body. Preferably, these arms are operatively connected by another gear which is also rotatably mounted in the jig body interior, and which also serves to mount the second pair of arms in the jig body interior, preferably in combination with at least one guide for each arm to slidably position the two arms in parallel relationship to the vertical centerline of the jig body.

The two pairs of arms must be mounted offset from one another so that each pair may be freely extended or retracted without interference from the other pair of arms. Each arm has teeth to operatively connect the arm to the rotatably mounted gears described above. The precision of the self-centering jig will increase as the gear teeth on the arms become finer (i.e., the higher the number of gear teeth per linear inch). The length of the arms should be sufficient to permit use of the jig with all conventional sizes of planar articles, such as cabinet drawer fronts. Alternatively, various length arms may be provided to permit substitution of one pair of arms with a second pair having a shorter or greater length, and thereby permit easier handling of the self-centering jig when different sized planar articles are being marked or drilled.

The arms of the self-centering jig should be made of rigid and durable material to maximize the accuracy, precision and durability of the apparatus. Steel is preferred.

Each of the four arms have means for engaging the edges or sides of a planar article such as a cabinet front. The engagement means may be any means capable of preventing further retraction of the arm toward the jig body upon engagement with the side of the planar article, and includes both "L" and "U" shaped flanges, and clamps.

It is important that the engagement means are of sufficiently wide construction that they serve to accurately square the jig body to the planar article, as holes cannot be accurately marked or drilled otherwise. Thus, the engagement means should engage a portion of the edge or side of the planar article which is sufficient to obtain a truly perpindicular position with respect to the engaged side of the planar article.

Figure 1:
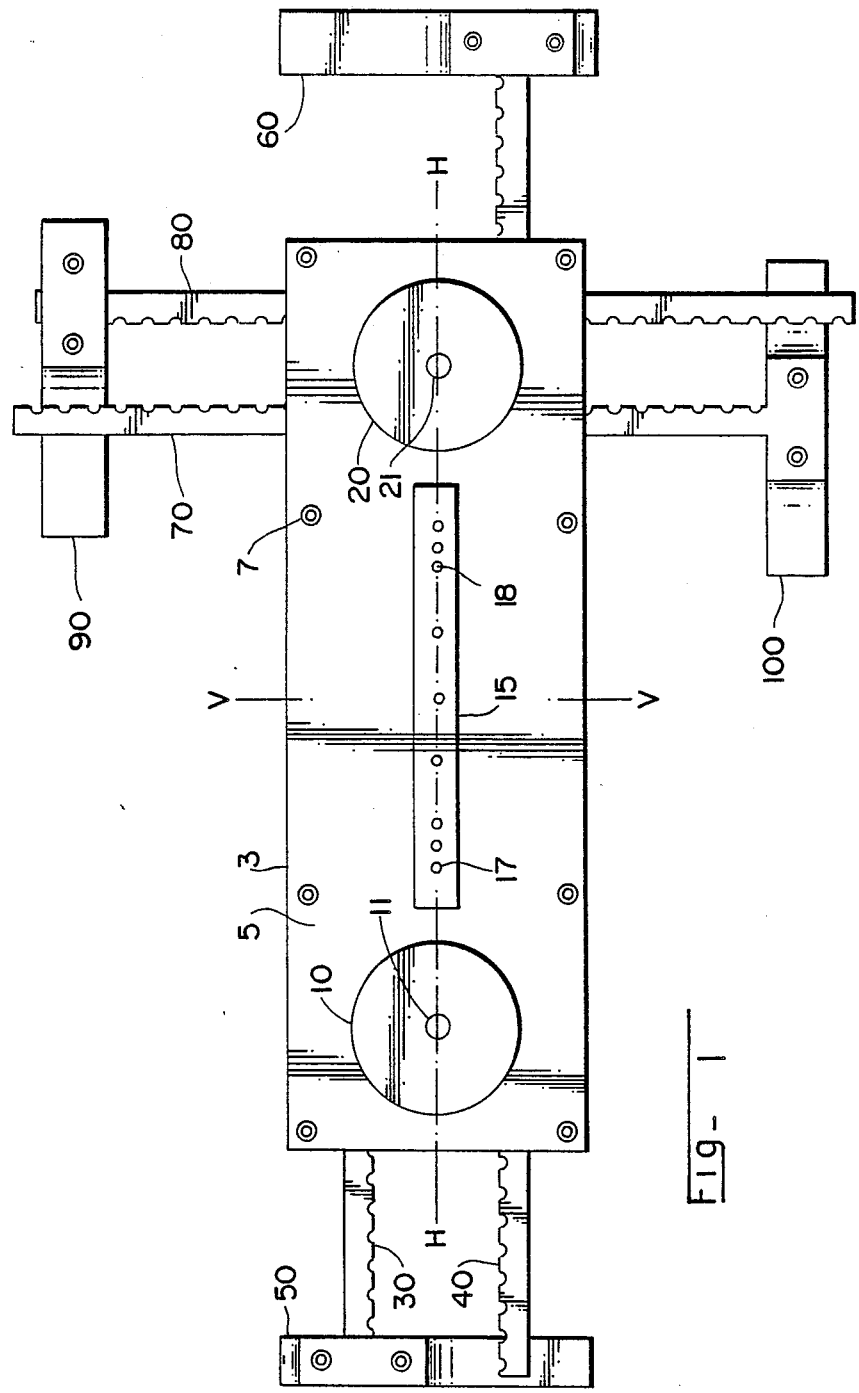
FIG. 1 is a plan view of a self-centering jig according to the present invention.
Figure 2:
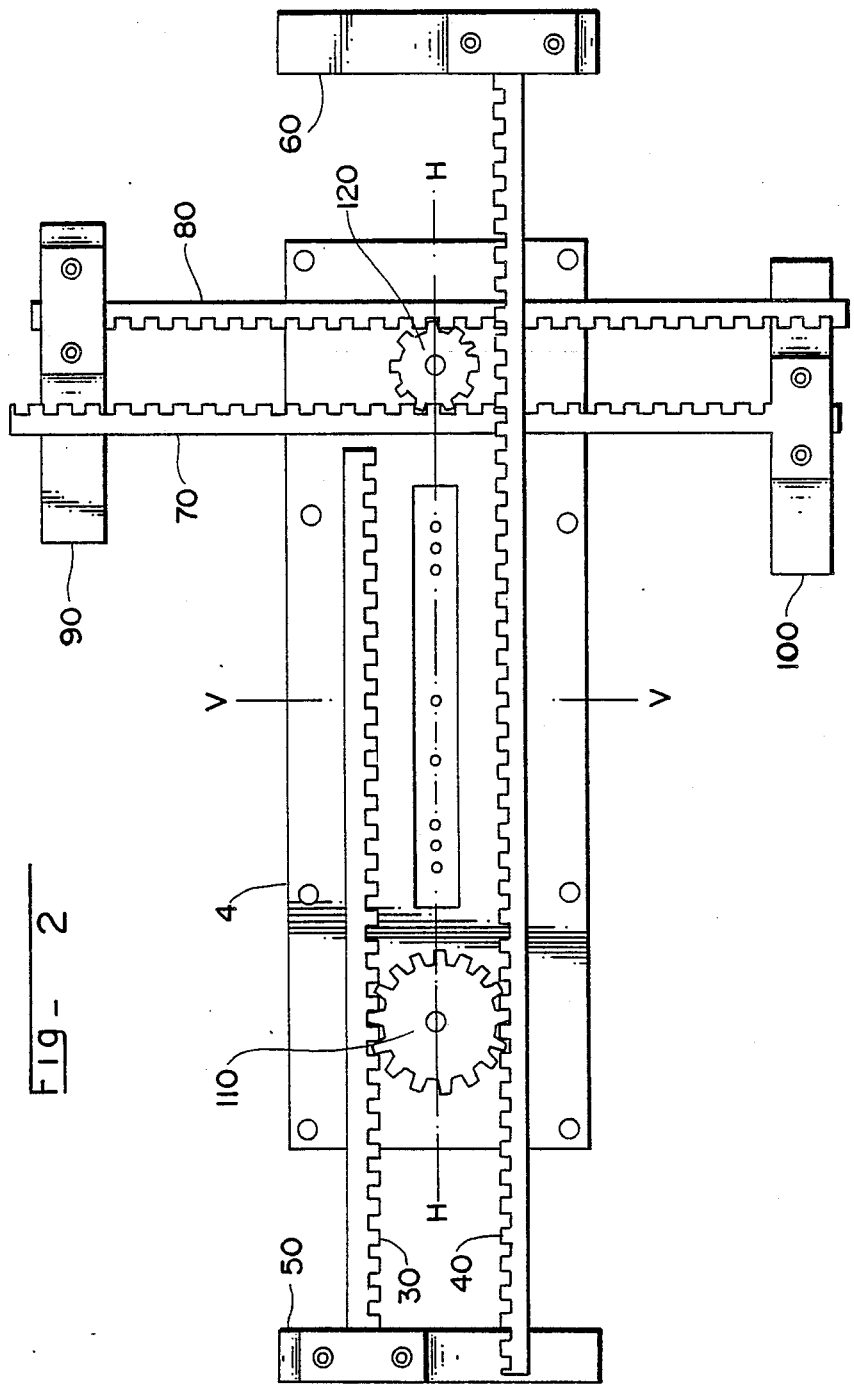
FIG. 2 is a cutaway plan view of the self-centering jig illustrated in FIG. 1.

Referring to FIGS. 1 and 2, jig body 5 comprises front cover plate 3 and rear cover plate 4 secured together by a plurality of fastening means such as bolts 7.

Template section 15 is removably mounted in jig body 5 and may comprise a flat rectangular plate having a plurality of holes 17 arranged on the surface thereof in pre-determined patterns to fit standard cabinet pull patterns. Magnetized plugs 18, adapted to fit within holes 17, may be used to fill holes which do not form a desired pattern, and thereby prevent accidental drilling of a hole which is not part of a desired pattern.

Knobs 10 and 20 are rotatably mounted on front cover plate 3, and are connected to gears 110 and 120 respectively via pins 11 and 21. As shown in FIG. 2, gears 110 and 120 are rotably mounted on rear cover plate 4. Arms 30 and 40 are in opposed parallel relationship, each having teeth which are in cooperating relationship with gear 110 such that engaging means 50 and 60 attached to arms 30 and 40 are equally spaced from vertical centerline V of jig body 5. Rotation of knob 10 will turn gear 110, which will extend or retract arms 30 and 40 depending on whether the rotation is clockwise or counterclockwise.

Similarly, arms 70 and 80 are in opposed parallel relationship, each having teeth which are in cooperating relationship with gear 120, such that engaging means 90 and 100 attached to arms 70 and 80 are equally spaced from horizontal centerline H of jig body 5. Rotation of knob 20 will turn gear 120, which will extend or retract arms 70 and 80 depending on whether the rotation is clockwise or counterclockwise.

Engaging means 50 and 60 are mounted at the ends of arms 30 and 40 respectively, and are adapted to abut against the vertical sides of a planar article (not shown), such that further retraction of arms 30 and 40 will be prevented upon engagement with the sides of the article. Similarly, engaging means 90 and 100 are mounted at the ends of arms 80 and 70 respectively, and are both adapted to abut against the horizontal top and bottom sides of a planar article (not shown) such that further retraction of arms 70 and 80 will be prevented upon engagement with the top and bottom sides of the article.

Figure 3:
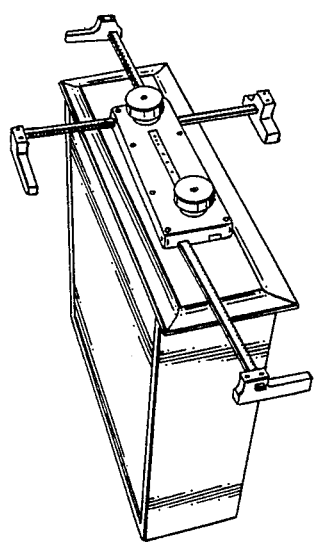
FIG. 3 is a photograph of the self-centering jig illustrated in FIG. 1 positioned upon a cabinet drawer front.

The operation of the self-centering jig illustrated in FIGS. 1-2 and described above will be illustrated by describing its use to locate a centerpoint on a cabinet front. Knobs 10 and 20 are each rotated to extend arms 30, 40, 70 and 80 beyond the four sides of the cabinet front. The jig is then placed against the cabinet front as shown in FIG. 3, and knob 20 rotated to retract arms 70 and 80 until they are snugly engaged against the top and bottom sides or edges of the cabinet front, thereby centering the jig body to the horizontal centerline of the cabinet front. Knob 10 is then rotated until arms 30 and 40 are snugly engaged against the sides or edges of the cabinet front, thereby centering the jig body to the vertical centerline of the cabinet front, and thereby completely "squaring" the jig body to the cabinet front. One or more holes are then marked and/or drilled into the cabinet front through holes 17 in template section 15 while engagingmmeans 50, 60, 90 and 100 maintain the jig in correct position.

The jig may be maintained in position against the article to be drilled simply by holding either of knobs 10 and 20 while marking/drilling the desired holes. This permits accurate centering and drilling operations to be rapidly performed. For example, a worker can accurately center and drill a drawer front in 10-15 seconds using the above-described embodiment of the present invention.

Although not required, the self-centering jig may optionally have means for maintaining the positions of its arms once the engagement means have engaged the sides or edges of the planar article which is to be marked or drilled. Such maintaining means can include the knurled tightening clamps 6 and 8 and/or springs 12 and 13, as shown in FIG. 4.

The advantages of the self-centering jig include accurate, rapid self-centering coupled with ease of use and durable, simple construction. More particularly the present invention minimizes, if not eliminates, the probem of initial manual adjustment of a template and offers workers an easy-to-use apparatus for quickly locating the centerpoint of a planar article such as a cabinet front. The use of the self-centering jig of the present invention will thus improve productivity by reducing the time spent in drilling operations and improve quality by ensuring consistent and precise location of holes for pulls and handles.

I claim:

1. A self-centering jig for precisely locating at least one point on a planar article, comprising
   (i) a jig body having a vertical centerline and a horizontal centerline and having a template section, said template section having a plurality of drill holes;
   (ii) a first pair of operatively-connected arms extendibly mounted in the jig body for uniform horizontal movement in opposite directions from said vertical centerline, said arms having means for engaging the vertical sides of the planar article on the ends of said arms;
   (iii) means for mounting and operatively connecting said first pair of arms to said jig body, such that when said engaging means are engaged with said vertical sides of said planar article said jig body is centered on a vertical centerline of said planar article;
   (iv) a second pair of operatively-connected arms extendibly mounted in the jig body for uniform vertical movement in opposite directions from said horizontal centerline, said arms having means for engaging the top and bottom edges of said planar article;
   (v) means for mounting and operatively connecting said second pair of arms to said jig body, such that when said engaging means are engaged with said top and bottom edges of said planar article, said jig body is centered on a horizontal centerline of said planar article.

2. The self-centering jig of claim 1, further comprising means for maintaining said arms in a desired position.

3. The self-centering jig of claim 2, wherein said means for maintaining said arms in a desired position comprises clamping means.

4. The self-centering jig of claim 2, wherein said means for maintaining said arms in a desired position comprises spring means.

5. The self-centering jig of claim 1, wherein said means for engaging said arms to the vertical sides of said planar article comprise flange means.

6. The self-centering jig of claim 1, wherein said template section is removable.

7. The self-centering jig of claim 1, wherein said template section comprises plurality of drill patterns.

8. The self-centering jig of claim 7, further comprising adhereable plugs for said drill holes.

9. The self-centering jig of claim 8, wherein said adhereable plugs are magnetized.

10. The self-centering jig of claim 7, wherein said template section further comprises drill hole inserts adapted to be threaded into said drill holes.

11. The self-centering jig of claim 1, wherein said means for mounting and operatively connecting said first pair of arms comprise a rotatably mounted gear.

12. The self-centering jig of claim 1, wherein said means for mounting and operatively connecting said second pair of arms comprise a rotatably mounted gear.

13. A self-centering jig for precisely locating at least on point on a planar article, comprising
   (i) a jig body having a vertical centerline and a horizontal centerline and having a template section having at least one hole therethrough;
   (ii) a first pair of operatively-connected arms extendibly mounted in the jig body for uniform horizontal movement in opposite directions from said vertical centerline, said arms having means for engaging the vertical sides of the planar article on the ends of said arms;
   (iii) means for mounting and operatively connecting said first pair of arms to said jig body, such that when said engaging means are engaged with said vertical sides of said planar article said jig body is centered on a vertical centerline of said planar article;
   (iv) a second pair of operatively-connected arms extendibly mounted in the jig body for uniform vertical movement in opposite directions from said horizontal centerline, said arms having means for engaging the top and bottom edges of said planar article;
   (v) means for mounting and operatively connecting said second pair of arms to said jig body, such that when said engaging means are engaged with said top and bottom edges of said planar article, said jig body is centered on a horizontal centerline of said planar article, wherein said means for mounting and operatively connecting said first pair arms to said jig body are non-concentric with said means for mounting said second pair of arms to said jig body.

14. The self-centering jig of claim 13, wherein said template section has a plurality of drill holes, such that a plurality of drill patterns may be selected from said template.

15. The self-centering jig of claim 13, wherein said means for mounting and operatively connecting said first pair of arms comprise a rotatably mounted gear.

16. The self-centering jig of claim 13, wherein said means for mounting and operatively connecting said second pair of arms comprise a rotably mounted gear.

17. The self-centering jig of claim 13 wherein said template section is located between (i) said means for mounting and operatively connecting said first pair of arms and (ii) said means for mounting and operatively connecting said second pair of arms.

* * * * *